May 12, 1970  R. BARTHOLOMÄUS  3,511,273
PRESSURE GAUGE AND VALVE THEREFOR
Filed April 19, 1968  2 Sheets-Sheet 1

INVENTOR
Rainer BARTHOLOMÄUS
By Michael S Striker
Attorney

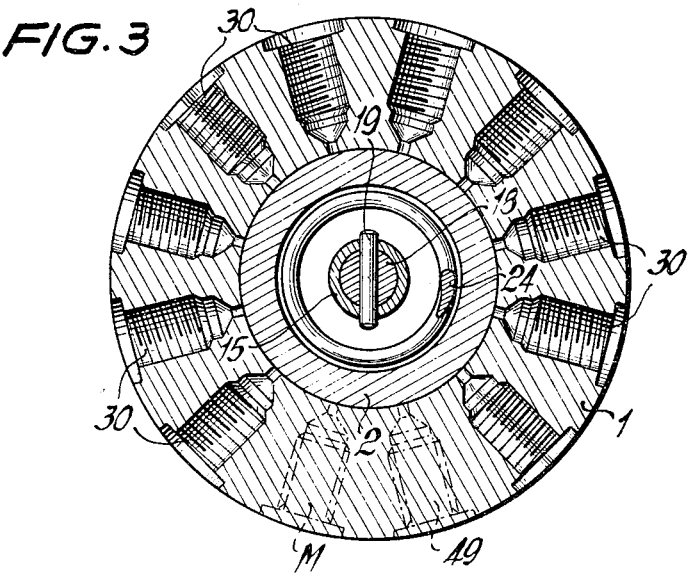
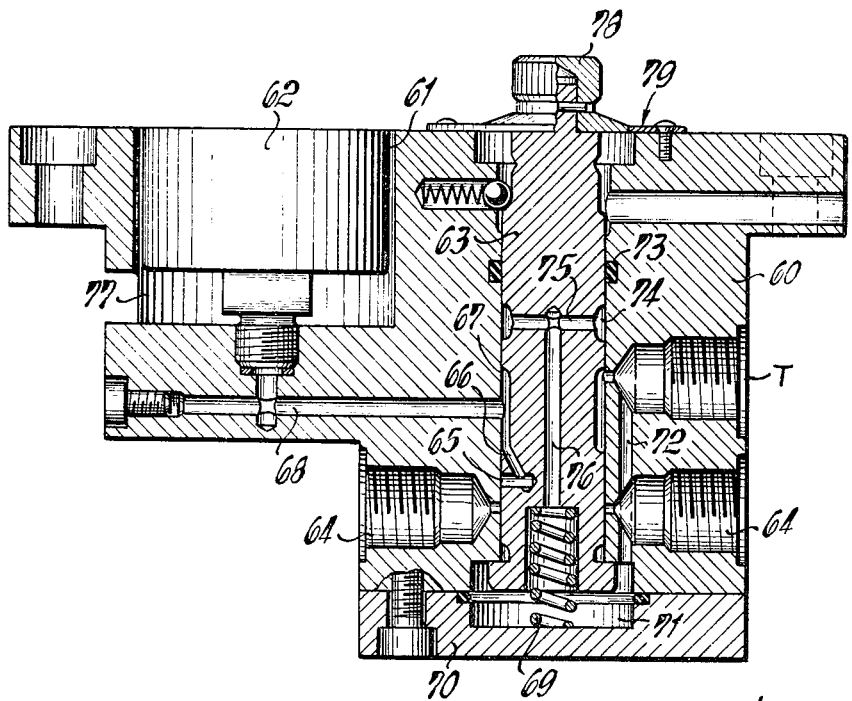

United States Patent Office 3,511,273
Patented May 12, 1970

3,511,273
PRESSURE GAUGE AND VALVE THEREFOR
Rainer Bartholomäus, Lohr (Main), Germany, assignor, by mesne assignments, to Gesellschaft fuer Hydraulikzubehoer m.b.H., Sulzbach, Saar, Germany
Filed Apr. 19, 1968, Ser. No. 722,612
Claims priority, application Germany, Apr. 26, 1967, R 45,870
Int. Cl. F16k *37/00, 11/02*
U.S. Cl. 137—557
8 Claims

ABSTRACT OF THE DISCLOSURE

A valve which is provided with an annulus of connections for admission of fluids from several pressure systems and includes a selector rotatable in the valve housing and having a bore which can be moved into registry with a selected connection in response to axial and angular displacement of the selector whereby the selector admits pressure fluid from the selected connection to the pressure port of a pressure gauge which is adjustably installed in the selector or in the valve housing.

BACKGROUND OF THE INVENTION

The present invention relates to valves which control the admission of hydraulic or pneumatic fluids to the pressure ports of pressure gauges, particularly to valves which can be utilized to admit fluids from different circuits of a pressure system to facilitate rapid determination of fluid pressure in a selected circuit. For example, such valves are often utilized to admit liquid to a pressure gauge from a selected hydraulic circuit in the multi-circuit pressure system of a machine tool, a rolling mill, an injection molding machine, a strip mill, an extrusion press or many other hydraulic installations wherein the pressure in various circuits must be monitored at regular or irregular intervals.

In accordance with the presently prevailing practice, the pressure gauge is installed in a control panel or control stand independently of the valve and its pressure port or ports are connected with the outlet of the valve by way of one or more conduits. A drawback of such arrangements is that the valve and the pressure gauge together occupy too much room that the operator of the valve must divide his or her attention between the movable part or parts of the valve and the dial and pointer of the pressure gauge. Furthermore, the conduits which connect the gauge with the valve are likely to develop leaks.

SUMMARY OF THE INVENTION

It is an object of my invention to provide a novel arrangement which includes a valve capable of receiving hydraulic or pneumatic fluids from two or more circuits and a pressure gauge which can indicate the pressure of fluids whose flow is controlled by the valve, and to construct and assemble the arrangement in such a way that it occupies little room, that it can be readily sealed against uncontrolled escape or leakage of fluids, and that the person manipulating the valve is in the optimum position to observe the dial of the pressure gauge.

Another object of the invention is to provide an arrangement of the just outlined character which is just as versatile as the above outlined conventional arrangements but is simpler, more compact, less expensive and cheaper to install.

A further object of the invention is to provide an arrangement which can be designed to permit monitoring of pressures in any desired number of hydraulic or pneumatic circuits and which renders it possible to determine the exact pressure of fluid in a particular circuit or in any one of several circuits by way of laboratory gauges or other precision pressure measuring instruments.

Still another object of the invention is to provide an arrangement wherein the dial of the pressure gauge can be readily moved to and locked in an optimum position for observation of its graduations and of the pointer without necessitating any lengthy adjustments in the position and/or operation of the valve.

The invention resides in a structure or arrangement which includes a valve provided with a plurality of connections adapted to receive pressure fluid from several hydraulic or pneumatic circuits of an industrial installation, machine tool, press, mill or the like, and a pressure gauge which is installed directly in the valve. The gauge has one or more fluid-receiving ports and the valve comprises a selector which is operative to establish a path for the flow of fluid between the port or ports of the gauge and a selected connection.

Such mounting of the gauge directly in the valve renders it possible to place the dial of the gauge into close or immediate proximity of the selector and to install the structure in or on a control panel or control stand where the two components occupy little room. The cost of installing the improved structure in or on a control panel is minimal because the gauge is installed in the valve and can be furnished therewith as a prefabricated unit. For example, the combined valve and gauge can be installed in a suitably configurated recess or hole of the control panel. Moreover, the pipes or conduits which connect conventional valves with the pressure gauges can be dispensed with so that the likelihood of leakage is less pronounced.

The gauge can be installed in different parts or components of the valve. For example, such gauge can be installed directly in the selector, in that portion of the valve housing which accommodates the selector, or in a cover of the housing. The improved structure is particularly compact if the gauge is installed in the selector proper because the dimensions of the valve housing then depend mainly or exclusively on the dimensions of the selector and also because the operator can manipulate the selector while at the same time looking at the dial and pointer of a gauge which is mounted in and preferably shares certain movements of the selector.

The connections are preferably provided in the valve housing, and the selector and the housing are provided with channels in the form of cutouts, chambers, ports, grooves and/or bores which can establish a path for the flow of a fluid from a selected connection to the pressure port or ports of the gauge.

The novel features which are considered as characteristic of the invention are set forth in particular in the appended claims. The improved structure itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a horizontal sectional view as seen in the direction of arrows from the line III—III of FIG. 1; and FIG. 4 is an axial sectional view of a second valve wherein the gauge is built into the housing.

DESCRIPTION OF THE PREFERRED EMBODIMENTS

Figure 1:
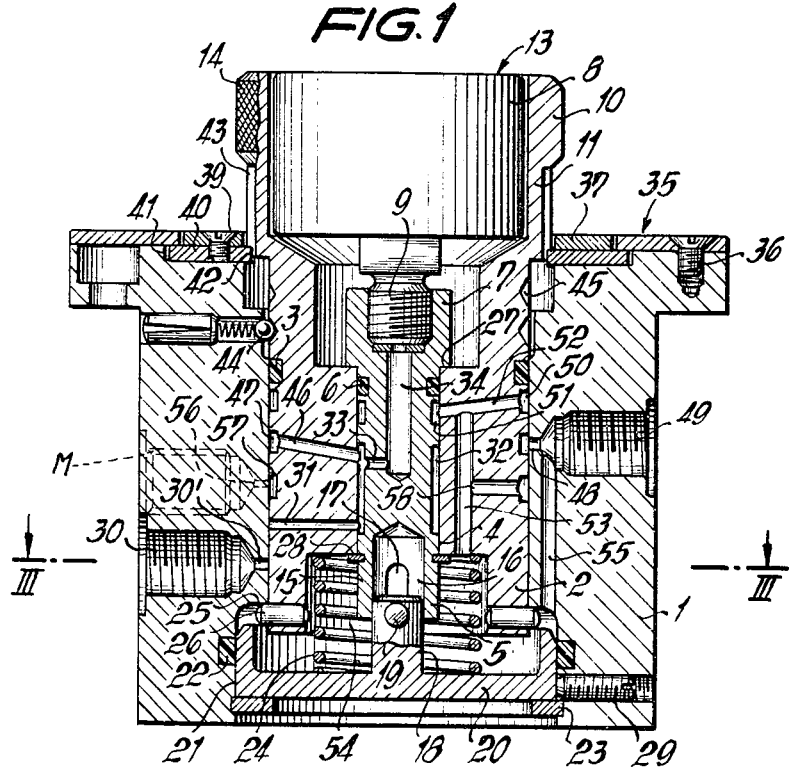
FIG. 1 is an axial sectional view of a valve wherein the pressure gauge is built into a rotary selector, the section of FIG. 1 being taken in the direction of arrows as seen from the line I—I of FIG. 2.
Figure 2:
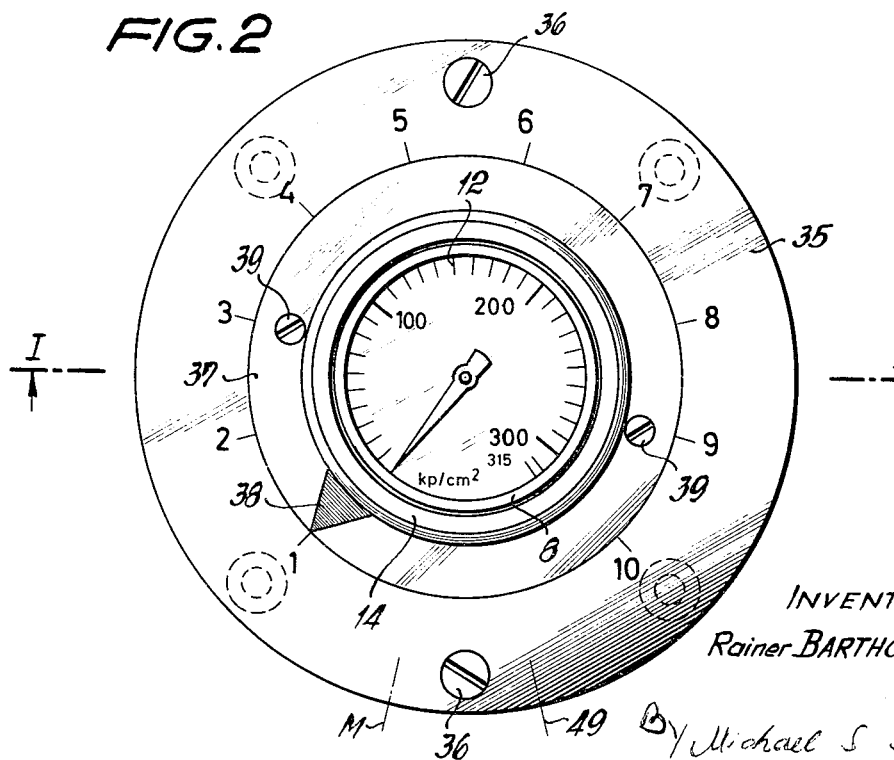
FIG. 2 is a top plan view of the structure shown in FIG. 1.

FIGS. 1 to 3 illustrate a valve and a pressure gauge 8 which is built into the rotary valve member 2 (hereinafter called selector) of the valve. The latter further comprises a housing 1 which can be installed in a control panel or in a control stand (not shown). The selector 2 resembles a hollow cylinder which is rotatable and reciprocable in an internal cylindrical passage of the housing 1 and is provided with a circumferential groove for a sealing ring 3. An axial cylindrical passage 4 of the selector 2 accommodates a rotary insert or core 5 which is also provided with a circumferential groove for a sealing ring 6 located substantially at the level of the sealing ring 3. The outer end portion or head 7 of the insert 5 has a tapped bore for an externally threaded nipple 9 defining the pressure port of the gauge 8. The sleeve-like casing 10 for the gauge 8 is integral with the selector 2; this casing 10 comprises an outer portion 14 which is knurled and an inner portion 11 which is provided with axially parallel flutes. The casing 10 constitutes a knob which can be grasped by hand to change the angular and/or axial position of the selector 2. The dial 12 of the pressure gauge 8 faces upwardly, as viewed in FIG. 1, and is flush with the outer end face 13 of the casing 10.

The inner end portion 15 of the insert 5 has an axially extending blind bore 16 and two radially extending slots 17 which communicate with the bore 16 and are located diametrically opposite each other. The slots 17 receive portions of a diametral coupling pin 19 which is inserted into a cylindrical projection 18 on a cupped cover 20 forming part of inserted into an axial recess 21 provided in the inner end face of the main portion of the valve housing 1. The pin 19 enables the insert 5 to move axially with reference to the cover 20 but compels the insert to share all angular movements of the cover. The latter is rotatable in the recess 21 and is surrounded by a sealing ring 22 which is recessed into the internal surface of the main portion of the housing 1. A split ring 23 is provided to hold the cover 20 against axial movement with reference to the main portion of the housing 1. The cover 20 also serves as a retainer for one end convolution of a helical return spring 24 which is installed in the housing 1 to bias the selector 2 and the insert 5 axially to the idle positions which are shown in FIG. 1. The means for arresting the selector 22 in such idle position comprises a pair of coaxial stop pins 26 which bear against an internal shoulder 25 of the housing when the spring 24 is free expand. The stop pins 26 are mounted in the selector 2. The head 7 of the insert 5 bears against an internal shoulder 27 of the selector 2 to prevent inward axial movement of the insert. A split ring 28 is received in a circumferential groove of the insert 5 and bears against an internal shoulder of the selector 2 to prevent any axial movement of the insert with reference to the selector; however, the latter is rotatable with reference to the insert between ten fluid-admitting positions by way of the casing or knob 10. As stated before, the insert 5 is non-rotatably but axially movably connected to the cover 20 by way of the coupling pin 19. The purpose of rotary mounting of the cover 20 in the housing 1 is to facilitate angular displacement of the pressure gauge 8 to a desired position in which the dial 12 of the gauge in an optimum position for observation by the person in charge. Once the dial 12 is moved to such desired angular position, the cover 20 is fixed to the housing 1 by a radial locking screw 29 shown in the lower right-hand portion of FIG. 1.

The housing 1 is provided with an annulus of connections 30 to ten different circuits of a hydraulic pressure system which is to be monitored by the gauge 8. The connections 30 constitute tapped bores in the peripheral surface of the housing 1 and are equidistant from each other, see FIG. 3. All of these connections 30 are located at the same level and communicate with radial orifices or channels 30' which extend to the internal surface of the housing 1. The selector 2 has a radial bore or channel 31 whose inner end communicates with a circumferential groove or channel 32 of the insert 5. The groove 32 further communicates with a radial port or channel 33 of the insert 5, and this radial port 33 communicates with an axially extending blind bore or channel 34 which is in communication with the pressure port in the nipple 9 of the gauge 8. In order to establish a path for inflow of a pressure medium from a desired connection 30, the operator turns the selector 2 to one of the ten fluid-admitting positions by way of the casing or knob 10 until an index 38 which is connected to the selector registers with a desired graduation on a scale 35 which is fixed to the housing 1. The scale 35 is secured to the top face of the housing 1 by screws 36 and each of its graduations (1–10) registers with one of the connections 30. The index 38 is provided on a ring 37 which is affixed to a second ring 40 by screws 39. The outer marginal portion 41 of the second ring 40 is overlapped by the inner marginal portion of the scale 35 which thus holds the rings 37, 39 against axial movement. The inner marginal portion 42 of the ring 40 is toothed or fluted and engages with the flutes 43 of the portion 11 of the casing or knob 10 so that the rings 37, 40 are compelled to share all angular movements of the knob 10 and selector 2.

Once the index 38 registers with a desired graduation on the scale 35, the operator exerts axial pressure against the knob 10 to displace the selector 2 to an operative position against the opposition of the return spring 24 whereby the radial bore 31 of the selector moves into registry with the orifice 30' of the desired connection 30 and the latter admits pressure medium to the axial bore 34 of the insert 5 so that the pressure medium enters the pressure port of the gauge 8. The pointer of the gauge 8 then indicates the pressure of such medium on the scale 12. The operator feels when the bore 31 registers with one of the orifices 30' because the housing 1 accommodates a spring-biased detent ball 44 which then snaps into the upper one of two axially spaced circumferential grooves 45 of the selector 2. The bias of the spring for the ball 44 is adjustable by a radial screw (shown in FIG. 1) so that the ball 44 can actually hold the selector 2 in operative position when it enters the upper circumferential groove 45. The connection between the bore 31 and one of the orifices 30' is interrupted in response to such a pull upon the knob 10 which suffices to remove the ball 44 from the upper groove 45 and to permit movement of the selector to idle position under the bias of the return spring 24.

The path which relieves the pressure of the gauge 8 and permits the pointer of the gauge to return into registry with the zero graduation of the scale 12 is defined in part by a second radial bore 46 in the selector 2. This bore 46 communicates with the groove 32 of the insert 5 and with a circumferential groove 47 of the selector 2. The groove 47 communicates with the inlet orifice 48 of a return port 49 (provided in the housing 1 and connected to the drain, not shown) when the selector 2 returns to the idle position shown in FIG. 1. In order to relieve the pressure upon the sealing rings 3 and 6, the valve is provided with two additional circumferential grooves 50, 51 which are respectively machined into the selector 2 and insert 5 inwardly of the rings 3 and 6. The grooves 50, 51 are connected to each other by a radial bore 52 in the selector 2. The bore 52 communicates with an axially parallel bore 53 of the selector 2, and the lower end of the bore 53 communicates with a chamber 54 which is defined by the main portion of the housing 1, selector 2, insert 5 and cover 20 and accommodates the return spring 24 as well as the projection 18 and coupling pin 19. The chamber 54 is connected to the return port 49 by an axially parallel bore 55 in the housing 1. When the selector 2 moves axially to operative position against the opposition of the return spring 24, it expels fluid from the chamber 54 by way of the bore 55 and return port 49.

If the operator desires to employ a separate pressure gauge, for example, a laboratory gauge which is capable of furnishing highly accurate readings, the nipple of the laboratory gauge is threaded into an auxiliary connection or port M which is provided in the housing 1 at a level above the connections 30, as viewed in FIG. 1. The connection M has an orifice 56 which communicates with a circumferential groove 57 of the selector 2 when the latter assumes the idle position shown in FIG. 1. The groove 57 communicates with a radial bore 58 of the selector 2, and the bore 58 further communicates with the aforementioned axially parallel bore 53. When the selector 2 is depressed and its radial bore 31 registers with the orifice 30' of one of the connections 30, i.e., when the selector simultaneously assumes the operative position and one of its fluid-admitting positions, the orifice 56 of the auxiliary connection M communicates with the same orifice 30' by way of the radial bore 31, groove 32, bore 46 and groove 47, i.e., the laboratory gauge then receives pressure fluid from the same connection 30 which delivers pressure fluid to the pressure port of the gauge 8 by way of the bore 31, groove 32, bore 33 and bore 34. The auxiliary connection M is automatically connected with the return port 49 when the selector 2 returns to idle position because the orifice 56 then communicates with the bore 55 by way of the groove 57, bores 58, 53 and chamber 54.

FIG. 4 illustrates a second valve with a pressure gauge 62 which is built into the housing 60 of the valve, i.e., not into the selector 63. The latter is solid because the insert 5 of FIGS. 1 to 3 can be dispensed with. The housing 60 has a cylindrical passage 61 for the gauge 62 and a second cylindrical passage for the axially reciprocable selector 63. The selector is biased upwardly to the idle position shown in FIG. 4 by a helical return spring 69 which is accommodated in a chamber 71 defined by the selector 63, the main portion of the housing 60 and a removable cover 70 which forms part of the housing. The connections 64 in the housing 60 correspond to the connections 30 of FIG. 1 or 3 and the orifice of one of these connections 64 communicates with a radial bore or channel 65 of the selector 63 when the latter is moved axially to operative position against the opposition of the return spring 69 and assumes a predetermined fluid-admitting angular position which is selected with the help of a scale 79 secured to the top face of the housing 60. The knob 78 of the selector 63 has an index which can be placed into registry with a desired graduation on the scale 79, each such graduation being aligned with one of the connections 64. The bore 65 communicates with an inclined outwardly extending bore or channel 66 and by way of the bore 66 with a circumferential groove or channel 67 which is in permanent communication with a radial bore 68 or channel provided in the housing 60 and serving to admit pressure fluid to the pressure port of the gauge 62 and to permit evacuation of pressure fluid from the gauge into a return port T which is connected with the drain. The groove 67 communicates with the return port T when the selector 63 assumes the idle position of FIG. 4. When the selector 63 is depressed to operative position, the groove 67 communicates with the orifice of one of the connections 64 by way of the bores 66, 65.

The chamber 71 communicates with an axial bore 76 of the selector 76 and the bore 76 communicates with a diametral bore 75 and by way of this bore with a circumferential relief groove 74 in the selector 63. The groove 74 relieves pressure upon the sealing ring 73 which is recessed into the internal surface of the housing 60 and surrounds the selector 63. The chamber 71 is in permanent communication with the return port T by way of an axially parallel bore 72 in the housing 60; in addition, the relief groove 74 comes into registry with the return port T when the selector 63 is depressed against the opposition of the return spring 69.

A non-circular portion of the nipple on the gauge 62 can be reached by way of a cutout 77 provided in the housing 60 and communicating with the passage 61. The cutout 77 enables the person installing the gauge 62 to place the dial of the gauge into an optimum angular position for reading.

The improved valve is susceptible of many additional modifications without departing from the spirit of my invention. For example, the gauge can be installed in another part of the valve, i.e., not necessarily in the selector or in the main portion of the housing. With reference to FIG. 1 or FIG. 4, the gauge 8 or 62 could be installed in the cover 20 or 70.

What is claimed as new and desired to be protected by Letters Patent is set forth in the appended claims.

1. A structure of the character described comprising a valve including a valve housing provided with a plurality of connections for admission of fluid; a pressure gauge installed in said valve and having fluid receiving port means; and selector means forming part of said valve and being movable with reference to said housing between a plurality of fluid admitting positions so as to be operative to establish a path for the flow of fluid between said port means and a selected connection, a portion of said selector means defining a compartment for said gauge.

2. A structure as defined in claim 1, wherein said portion of said selector means constitutes a knob by means of which said selector means is movable between said positions thereof.

3. A structure as defined in claim 1, wherein said selector means is rotatable between said plurality of fluid-admitting positions and is further movable axially with reference to said housing between an idle and an operative position, said pressure port means being in communication with one of said connections when said selector means simultaneously assumes said operative position and one of said fluid-admitting positions.

4. A structure as defined in claim 3, wherein said valve further comprises a core received in an axial passage of said selector means and coupling means connecting said core to said housing against rotation with said selector means, said gauge being connected with said core and said core being movable axially with said selector means, said core and said selector means and said housing being provided with channel means defining said path when said selector means assumes said operative position and one of said fluid-admitting positions thereof.

5. A structure as defined in claim 4, wherein said housing comprises a first portion which surrounds said selector means and a cover portion which is rotatable in said first portion and is connected to said core by way of said coupling means, and further comprising locking means releasably fixing said cover portion to said first portion.

6. A structure as defined in claim 1, wherein said selector means is movable in said housing axially between an idle position in which said pressure port means is sealed from said connections and an operative position, said selector means having a bore defining a portion of said path and said selector means being rotatable with reference to said housing between a plurality of fluid-admitting positions in each of which one of said connections registers with said bore in the operative position of said selector means.

7. A structure as defined in claim 6, wherein said pressure gauge is turnable in said valve and wherein said housing and said selector means are respectively provided with index means and scale means to indicate said fluid-admitting positions of the selector means.

8. A structure as defined in claim 6, further comprising detent means for yieldably holding said selector means in operative position and means for permanently biasing said selector means to idle position.

References Cited

UNITED STATES PATENTS

| 2,547,254 | 4/1951 | Braithwaite | 137—625.17 |
| 2,680,455 | 6/1954 | Raiteri | 137—625.4 XR |
| 3,008,490 | 11/1961 | Angelos | 137—625.11 |
| 3,034,528 | 5/1962 | Wharff | 137—625.11 XR |
| 3,246,667 | 4/1966 | Pemberton | 137—625.41 XR |

HENRY T. KLINKSIEK, Primary Examiner

U.S. Cl. X.R.

137—625.17